INVENTOR.
DANIEL E. ALTMAN

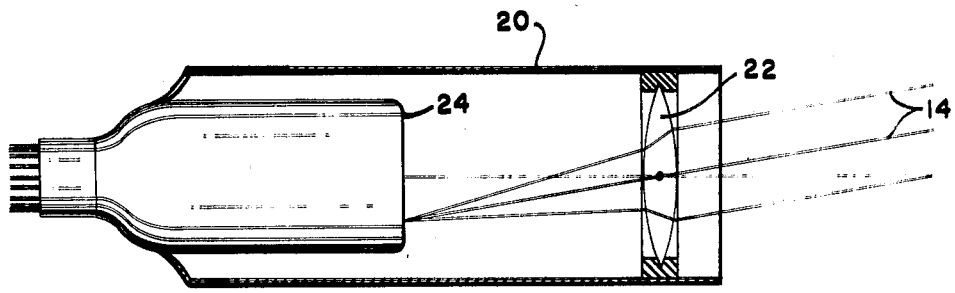
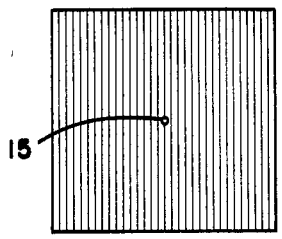
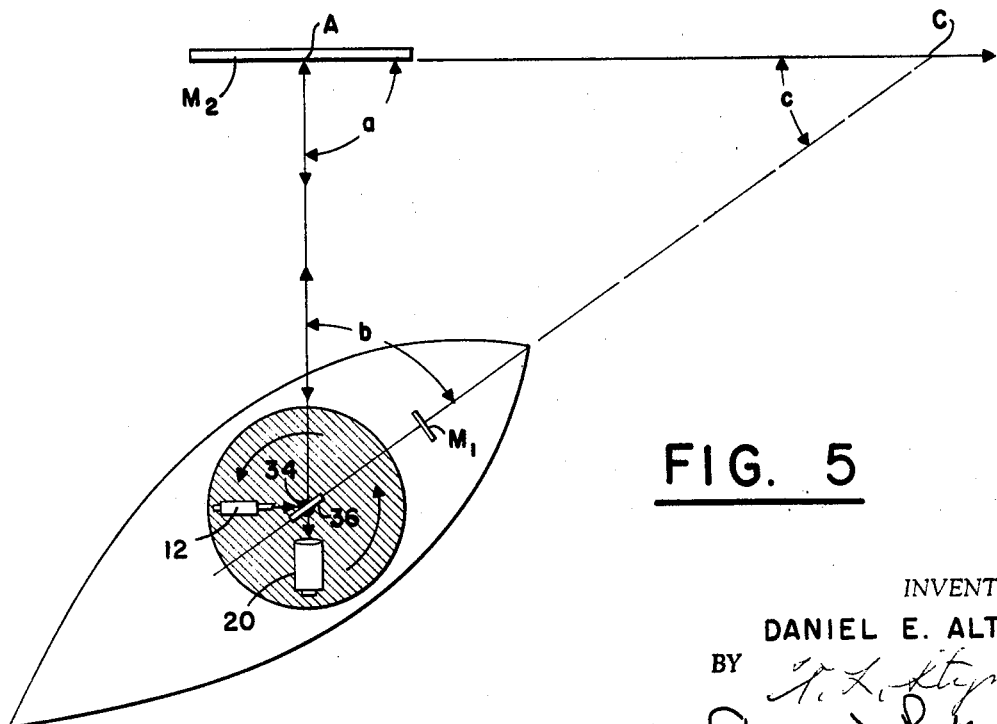

United States Patent Office 3,669,548
Patented June 13, 1972

3,669,548
METHOD FOR DETERMINING A SHIP'S HEADING EMPLOYING AN ELECTRO-OPTICAL ANGLE MEASURING DEVICE
Daniel E. Altman, San Diego, Calif., assignor to the United States of America as represented by the Secretary of the Navy
Filed July 13, 1970, Ser. No. 54,502
Int. Cl. G01c 1/02
U.S. Cl. 356—141                                    1 Claim

ABSTRACT OF THE DISCLOSURE

Surveying means and method are shown for measuring the angles of a triangle one corner of which is on an unstable platform. An optical system establishes a base line, which will move parallel to itself in response to movement of the platform without altering any of the angles of the triangle. Measurement of two angles, yields the third.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A most difficult surveying problem is presented when measurements must be made from a reference point or bench mark which is unstable, as the deck of a floating ship. Even though the ship may be secured to a wharf by taut lines, the ship nevertheless is perpetually in motion. Yet the center line of the hull must at all times be known in calibrating shipboard equipment for sonar and radar beams. Preferably, the ship's heading is established by measuring the position of the center line with respect to a fixed reference point on shore.

The object of this invention is to provide means for instantaneously yielding the position of the ship's center line with respect to a base line and points on the base line.

SUMMARY OF THE INVENTION

The invention described here requires dynamic measurement of only one rather than two angles of a triangle and at the same time requires no computational correction for lateral displacement of the one point of the triangle which might be perpetually in motion. While the knowledge of two angles is required in order to determine the third angle, in the absence of any linear measurements, if one of the angles is constrained to have a fixed value then only measurement of the second is necessary to determine the triangle. In its broader aspects, the invention contemplates equipment which will establish a base line for the triangle and will permit the line to move laterally parallel to itself without changing the angles of the triangle. In one embodiment a grid of collimated parallel light beams, preferably laser beams, is set up at a known angle, $a$, relative to one side by means of a row of optical beam splitters. The grid is of sufficient width to cover the expected lateral drift of the ship, such as ten feet, and of sufficient depth to allow for height changes due to pitch and roll. In the correction for tides, it is preferred that the beam splitter array be moved up and down with the tide. The angle, $b$, of the triangle is measured in the image plane of a receiving telescope. The desired remaining angle, $c$, is simply angle $b$ plus $a$ the known constant determined during set up.

Other objects and features of this invention will become apparent to those skilled in the art by referring to the description of preferred embodiments in the following specification and shown in the accompanying drawings in which:

FIG. 3 is a sectional view of an alternative image plane type telescope with a television tube for measuring the angle';

FIG. 4 shows the raster on the image plane of the tube of the tube of FIG. 3 with the single spot of light produced by one or more collimated beams; and FIG. 5 shows an alternative arrangement of surveying equipment according to this invention.

The surveying problem to be solved by this invention comprises establishing the center line or keel of the ship 10 so that readings, say, of radar or sonar beams can be accurately calibrated with respect to the heading of that ship. It is assumed that the ship is floating but is tied up to anchored buoys or docking so as to minimize the magnitude and amount of drift. The center line is assumed to intersect a straight line laid out on shore. According to this invention the third side of the triangle, which will be termed the base line, moves parallel to itself as the unstable corner moves so that the angles of the triangle will not change with the shifting corner.

The shore line can be defined by a collimated beam from light source 12. Preferably the light source is a laser in which the beam is coherent and pencil size and directed along the shore line through point C.

Figure 1:
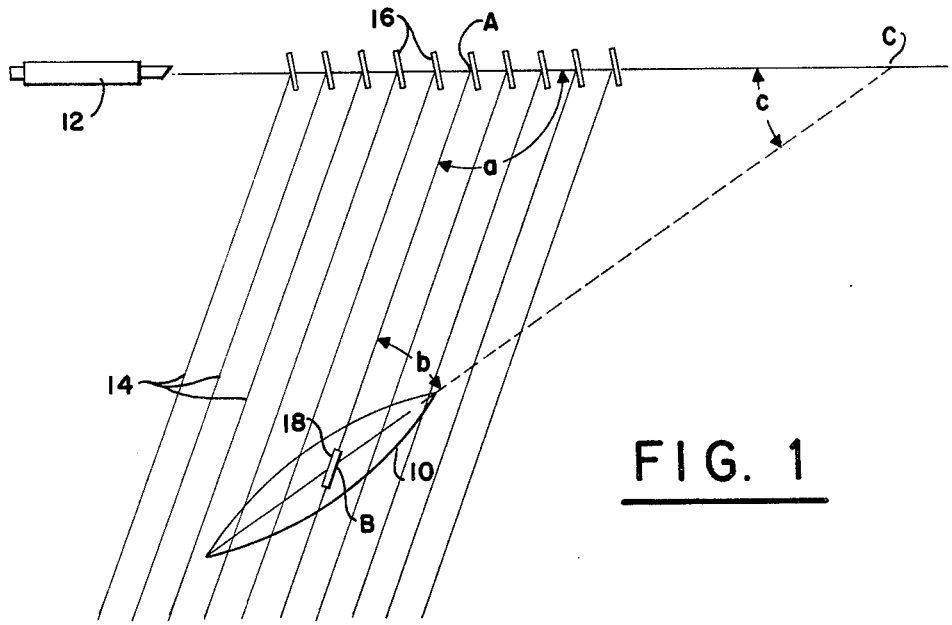
FIG. 1 is a plan view of the surveying equipment of this invention.
Figure 2:
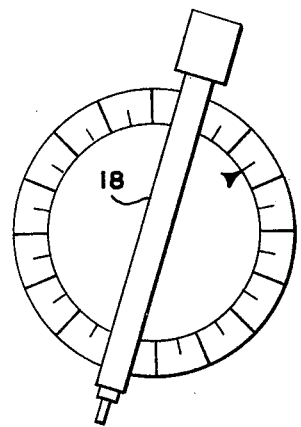
FIG. 2 shows an optical telescope of the type useable at one corner of the triangle to be solved; according to this invention.

In the embodiment of FIG. 1 the beam is subdivided and redirected into a plurality of parallel beams 14, each at the angle $a$ with respect to the shore line. Means for dividing the beam may comprise a series of mirrors 16 aligned along the shore line and parallel to each other and at the fixed predetermined angle which will establish the angle $a$ with respect to the shore line. The mirrors are preferably of Crown glass of optical quality, are ground to smooth parallel surfaces and are thinly filmed so as to be semi-transparent to incident light so that a measurable portion only of the transmitted primary light will be reflected.

A surveyor's transit or a telescope with angle measuring scales is mounted on the center line of ship 10 and is rotatable to sight on both point C and point A. If the aperture of the telescope is wide enough to at all times see at least one of the beams of the grid and if the optics of the telescope focus all images on the image plane of the telescope, the operator can always center the spot of light so that the barrel of the telescope stays parallel to the grid line 14. According to this feature of the invention drift of the telescope from one grid line to the next because of movement of the support will not disturb the angle reading $b$. The desired angle $c$ is simply angle $b$ plus a constant determined by the setup at the beam splitter 16.

In the interest of higher speed angle reading and accuracy, the optical telescope may be replaced with a Vidicon-type television camera tube or image dissector. As shown in FIG. 3, the barrel 20 of the telescope supports the optical system 22 which focuses all received light on the face 24 of the image dissector television tube. The aperture of the telescope determined partly by the amplification and diameter of the objective lens 22 is preferably sufficient to span or "see" at least two of the grid lines 14, FIG. 1. All beams passed by the lens will focus on one point on the image plane which point will move across the plane as the angle of the beam changes. The photosensitive plate in the image plane of the tube 24, shown in FIG. 4, is scanned from the rear, as is well known in the art of Vidicon-type television tube. Assuming reduced ambient light, the only light entering the image plane of the Vidicon is the light beam 14 which will produce the one spot 15 on the screen. If the telescope is centered on the source of flight, the spot will be in the center of the screen. Since a video output from the tube will occur when the electron beam sweeps the spot it is merely necessary to make equal the number of sweeps between the video signal and the two edges of the raster to know that the spot is centered.

An alternative embodiment of the invention for solving the triangle is shown in FIG. 5. Here the angle $a$ is set at 90° which will serve to simplify the equipment. Measurement of angle $b$ then solves completely the triangle as in FIG. 1. A large plane mirror M2 is employed instead of the beam splitter 16 and is set up on a stable base parallel to the base line A–C. The light source 12 and the beam sensing telescope 20 are mounted on a rotating base on the ship, along with a novel arrangement of mirrors for measuring angle $b$. The base, arranged to rotate manually or continuously on a vertical shaft 34, is connected to suitable rotational angle sensing equipment such as a digital shaft angle encoder, not shown. Only when the light beam strikes the mirror M2 perpendicularly will the beam reflect back upon itself and enter the receiving telescope. The optics of the system is so arranged, preferably, that a marker pulse will be produced at the two extremities of angle $b$. That is, as the sensing device rotates in the horizontal plane the photo cell or television tube of telescope 20 will give a pulse first when the beam is normal to the mirror M1 which is on and perpendicular to the ship's center line and then when it is normal to the mirror M2 which is parallel to the reference line. Mirror 36 is semi-transparent, similar to mirrors 16, so as to reflect as well as transmit the beam of source 12. The optical axis of the source 12 and the telescope 20 are preferable at 90° while the mirror 36 bisects that angle.

Obviously many modifications and variations of the present invention are possible in the light of the above teachings. It is therefore to be understood that within the scope of the appended claim the invention may be practiced otherwise than as specifically described.

What is claimed is:

1. The method of measuring the heading of a ship with respect to a known straight shore line, said method comprising the steps of:

projecting multiple spaced parallel collimated beams of light at a fixed predetermined angle from said shore line, movably positioning an electro-optical angle measuring device on the ship in alignment to receive a selected one of said collimated beams;

reading the angle of the selected beam of light with respect to the center line of the ship;

whereby the ship's heading relative to said shore line is the difference between said angle of the selected beam and, 180° less the fixed predetermined angle.

References Cited

UNITED STATES PATENTS

| 2,581,355 | 1/1952 | Brown | 356—138 |
| 3,230,475 | 1/1966 | Koester et al. | 331—94.5 |

RONALD L. WILBERT, Primary Examiner

O. B. CHEW II, Assistant Examiner

U.S. Cl. X.R.

356—152